United States Statutory Invention Registration [19]

[11] Reg. Number: H856

Kutik et al. [43] Published: Dec. 4, 1990

[54] CATION EXCHANGE Y ZEOLITES AS CORROSION INHIBITORS

[75] Inventors: Leon Kutik, Reisterstown; Roger J. Lussier, Ellicott City, both of Md.

[73] Assignee: W. R. Grace & Co.-Conn., New York, N.Y.

[21] Appl. No.: 226,020

[22] Filed: Jul. 29, 1988

[51] Int. Cl.[5] ..... C04B 9/02

[52] U.S. Cl. ..... 106/14.05; 106/14.22; 106/14.23

[58] Field of Search ..... 106/14.05; 524/450

[56] References Cited

U.S. PATENT DOCUMENTS

| | | | |
|---|---|---|---|
| 2,848,346 | 8/1958 | Bertorelli | 106/483 |
| 2,913,419 | 11/1959 | Alexander | 252/313 |
| 3,228,784 | 1/1966 | Mays et al. | 106/288 |
| 3,509,082 | 4/1970 | Mays | 260/22 |
| 3,899,624 | 8/1975 | Sutherland | 428/327 |
| 4,220,567 | 9/1980 | Kindervater et al. | 524/450 |
| 4,419,137 | 12/1983 | Cayless et al. | 106/14.39 |
| 4,687,595 | 8/1987 | Howes et al. | 252/387 |
| 4,738,720 | 4/1988 | Eckler et al. | 106/14.05 |

FOREIGN PATENT DOCUMENTS

| | | | |
|---|---|---|---|
| 0025346 | 2/1982 | Japan | 524/450 |
| 2084132 | 4/1987 | Japan | 524/450 |
| 1015704 | 1/1966 | United Kingdom | 524/450 |
| 1503153 | 8/1978 | United Kingdom | 252/389.53 |

OTHER PUBLICATIONS

Chem. Abst., 84:154070u, Kohlhass et al., Oct. 75.

*Primary Examiner*—John S. Maples
*Assistant Examiner*—Valerie D. Fee
*Attorney, Agent, or Firm*—Arthur P. Savage

[57] ABSTRACT

Zeolites free from heavy metal cations are ion-exchanged with alkaline earth metal cations. The exchanged zeolites provide corrosion resistance to paints for metals, especially ferrous metals, without environmental hazard caused by use of heavy-metal anti-corrosion materials such as lead, chromium, zinc, etc.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CATION EXCHANGE Y ZEOLITES AS CORROSION INHIBITORS

FIELD OF THE INVENTION

This invention relates to the corrosion protection of metals, especially ferrous metals.

SUMMARY OF THE INVENTION

Y zeolites (free from heavy metals) are ion-exchanged with ions of an alkaline earth metal. The cation exchanged Y zeolites provide corrosion resistance to paints for metals, especially ferrous metals, without health or environmental hazard caused by use of heavy-metal anti-corrosion materials such as lead, chromium, zinc, etc.

BACKGROUND OF THE INVENTION

In order to protect iron and steel objects which are exposed to atmospheric corrosion, for example, automobiles, railroad equipment, ships, bridges, storage tanks, and the like, it is routine to coat them with several layers of paints, the first of which, the primer, acts as a sealing layer between the metal and the atmosphere. This primer typically contains rather large quantities of a corrosion-protective material which is intended to inhibit the harmful effect of sulfur, nitrogen, and carbon oxides in the air, as well as water vapor. Materials used for this purpose in the past are the heavy metal compounds, such as red lead, zinc, chromium oxide, and the like. These are generally quite effective; unfortunately they often offer severe health hazards and enduring harm to the environment.

Extensive attempts have been made to develop anti-corrosion materials free from heavy metals.

U.S. Pat. No. 2,913,419 discloses a sodium aluminum silicate coating on a particle core, ion-exchanged with calcium nitrate, as an anti-corrosion paint additive.

U.S. Pat. Nos. 2,848,346, 3,228,784 and 3,509,082 disclose amorphous sodium aluminosilicate zeolite pigments and pigment extenders which may be exchanged with cations such as hydrogen, lithium, calcium, barium, ammonium or cadmium.

U.S. Pat. No. 3,899,624 discloses ion exchange resins containing zinc as anti-corrosion additive for paints.

U.S. Pat. No. 4,419,137 (British Petroleum Co.) discloses silica gel ion-exchanged with various metals as corrosion-inhibitors for paints.

U.S. Pat. No. 4,687,595 discloses making corrosion-inhibiting particles comprising binding calcium ions to particles of silica or alumina of a certain surface area, followed by heating and water removal.

U.S. Pat. No. 4,738,720 describes anti-corrosive coating compositions which contain calcium exchanged zeolites.

U.K. Pat. No. 1,503,153 discloses zeolites ion-exchanged with heavy metals as corrosion-inhibitors for paints.

DETAILED DESCRIPTION OF THE INVENTION

The invention is directed to a paint composition containing an alkaline earth metal exchanged Y zeolite as an anti-corrosion additive. The cation exchanged type zeolite is free from anti-corrosion heavy metals such as zinc, lead, and chromium. The invention includes the coatings resulting from the use of these paints, articles coated with the paints, and the method of rendering a paint non-corrosive by incorporating our treated zeolites into the paint.

The term "paint" is used in the generic sense and includes all liquid coating materials intended for application as protective coatings to surfaces, especially metal surfaces. Primers, sealants, and like coatings for iron, steel, and other ferrous metals are especially contemplated. The term "paint" also includes varnishes, enamels, and lacquers; pigmented and non-pigmented vehicles; and both oil- and water-based compositions.

Binders in these paints include drying oils, alkyd resins, epoxy resin esters, polyurethanes, phenol resins, urea resins, melamine resins, chlorinated rubbers, epoxide resins, polyamides, polyvinyl acetate, polyvinyl butyral, polyvinylidene fluoride, polyacrylic acid esters, and the like.

By heavy metals we mean those metals (as their compounds) customarily used in paint to inhibit corrosion on ferrous surfaces, such as Zn, Pb, Co, Cr and Mn.

The following examples illustrate without limiting the invention.

The cation exchanged Y zeolite which is used in the preparation of the paint compositions contemplated herein is obtained by ion-exchanging a Y zeolite (NaY), also referred to as Type Y crystalline aluminosilicate zeolite or synthetic faujasite, having the mol ratio chemical formula:

$H^+/Na_2O$: $Al_2O_3$: 3 to 50 $SiO_2$, with a solution of the desired alkaline earth metal cation (preferably $Ca^{++}$, $Mg^{++}$and/or $Ba^{++}$).

The Y zeolite precursor zeolites may comprise a sodium Y zeolite (NaY) of the type described in U.S. Pat. No. 3,130,007, or alternatively the Y zeolite may comprise a thermally/chemically modified ultrastable Y zeolite as described in U.S. Pat. No. 3,293,192 and 3,449,070 (USY) a unit cell dimension of about 24.2 to 24.6 Å.

Subsequent to exchange with aqueous solution of metal cation salts such as magnesium, calcium, barium chlorides, sulfates and nitrates, the cation exchanged Y zeolites have from about 10 to 99 percent of the alkali metal and/or hydrogen cations substituted by desired metal cations. These exchanged Y zeolites are referred to herein as CaNaY, Mg H NaY, etc. to indicate the type of cation exchange achieved.

The cation exchanged Y zeolites are incorporated in paint compositions in amounts ranging from about 1 to 20 weight percent of the composition and more preferably from about 2 to 10 weight percent.

In order to obtain suitable performance as an anti-corrosion pigment the cation exchanged Y zeolite is comminuted, i.e. milled or ground, to a particle size range of 50 to 2 microns. The grinding of the Y zeolite component may take place prior to or during addition to the paint formulation.

In a typical procedure for preparing the cation exchanged Y zeolite used in the present invention, a sodium Y zeolite (NaY) having a silica to alumina ratio of about 4.5 and containing about 13 weight percent $Na_2O$ is reacted with an aqueous exchange solution of alkali earth metal salt. The exchange solution may contain from about 1 to 25 weight percent of the desired metal salt. During the exchange procedure from about 2 to 10 parts exchange solution is combined with each part NaY at a temperature of 20° to 100° C. during which from 10 to 99 weight percent of the initial Na cation is substituted by alkaline earth metal cation. The resulting exchanged Y zeolite has the mol composition: 2 to 25

MO: 0.1 to 10 $Na_2O:Al_2O_3$:3 to 50 $SiO_2$ wherein M represents Ca, Mg, and/or Ba.

The above described general procedure may be conducted using a variety (including mixtures) of alkaline earth metal salt solutions and various Y zeolites such as USY, HY zeolites as well as NaY zeolites.

EXAMPLE I

Preparation of the various exchanged Y zeolites used in the subsequent Examples herein is described as follows:

Sample A comprises a hydrogen/sodium form of ultrastable zeolite Y (USY) which is exchanged to obtain various alkaline earth metal cation exchanged forms of USY. The ultrastable zeolite Y is prepared by ammonium exchange of a 5.0 $SiO_2/Al_2O_3$ ratio zeolite Y to about 3.8 weight percent $Na_2O$, and then calcining in the presence of steam at about 732° C.

Sample B was prepared by mixing 1000 g of USY (Sample A) in an exchange solution containing 1,798 g of a 42 percent $CaCl_2$ solution and 10,000 g $H_2O$ for ½ hour at 66° C. The slurry was filtered and washed with 8 1 66° C $H_2O$. The exchange and wash steps were repeated, and the sample was dried overnight at 138° C.

Sample C was prepared by adding 42.0 g magnesium oxide (MgO) to 2 1 $H_2O$, boiling one hour to hydrate the magnesia and then diluting to 4.0 1. To the above solution 1,000 g dry basis of USY (Sample A) was added, the slurry aged ½ hour at 66° C., filtered, washed on the filter with 2 1 16° C. $H_2O$ and dried overnight at 138° C.

Sample D was prepared by exchanging 1,000 g (dry basis) USY (Sample A) in a solution containing 10,000 g $H_2O$ and 1,000 g barium chloride for ½ hour at 66° C., filtered and rinsed on the filter with 2 1 66° C. $H_2O$. The exchange was repeated, the slurry filtered, washed with 8 1 66° C. $H_2O$ and dried overnight at 138° C.

The chemical analysis of the above exchanged Y zeolites is given in Table I.

TABLE I

CHEMICAL ANALYSES OF ZEOLITES USED AS CORROSION INHIBITORS FOR PRIMER COATINGS

| | Sample | | | |
|---|---|---|---|---|
| | A | B | C | D |
| | Composition | | | |
| | Na/H USY | Ca/Na USY | Mg/Na USY | Ba/Na USY |
| TV (wt. %) | 15.42 | 8.54 | 11.50 | 7.54 |
| $Na_2O$ (wt. %) | 0.75 | 0.75 | 3.62 | 0.77 |
| $SiO_2$ (wt. %) | 74.88 | — | — | — |
| $Al_2O_3$ (wt. %) | 22.97 | — | — | — |
| Surface Area, $m^2/gm$ | — | 815 | 886 | — |
| Metal Oxide (wt. %) | — | 3.19 (CaO) | 2.78 (MgO) | 7.13 (BaO) |

EXAMPLE II

Alkyd primers were prepared using the following ingredients:

| | Parts by Weight |
|---|---|
| Linseed/Soya Alkyd | 15.9 |
| Organic/Smectite Clay | 2.0 |
| Soya Lecithin | .3 |
| Mineral Spirits | 2.8 |
| Corrosion Inhibitor (as identified in TABLE II) | 4.5 |
| Magnesium Silicate | 14.0 |
| Red Iron Oxide | 24.8 |
| Lecithin | 0.47 |
| Iron Oxide 1301 | 8.16 |
| Dolomite | 6.70 |
| Barytes | 18.50 |
| Calcium Carbonate | 2.55 |
| Corrosion Inhibitor (as identified in TABLE III) | various |
| Mineral Spirits | 7.57 |

The above ingredients were ball milled to a maximum particle size of 37 microns. Then the following ingredients were added:

| | |
|---|---|
| Castor Wax | 0.30 |

The above mixture was dispersed on a high speed mixer for 15 minutes and milled to a particle size of 37 microns. Then the following ingredients were added with mixing.

| | |
|---|---|
| Linseed/Soya Alkyd | 28.2 |
| 6% Cobalt Napthenate | .3 |
| 6% Manganese Napthenate | .2 |
| 6% Zirconium Napthenate | .6 |
| Anti Skinning Agent | .1 |
| Mineral Spirits | 6.3 |

The resulting coatings were then applied to phosphated steel panels at a dry film thickness of approximately 1.1 mils. The coated panels were then scribed and subjected to the standard salt spray test (ASTM-B117) for 500 hours. Results are as follows.

TABLE II

| Test No. | Corrosion Inhibitor | Creepage from Scribe |
|---|---|---|
| 1 | Ba/Na USY (Sample D) | 1/16" |
| 2 | Na/H USY (Sample A) | ⅛" 8F blisters |
| 3 | Ca/Na USY (Sample B) | 1/16" |
| 4 | Sodium Type A Zeolite | ⅛" 8F blisters |
| 5 | Hydrotalcite | 1/16" |

The above data indicates that in test Nos. 1 and 3 the Ba/Na USY and Ca/Na USY corrosion inhibitors of the present invention are similar in effectiveness to the prior art inhibitor, Hydrotalcite. Na/H USY and sodium type A zeolite, which are not corrosion inhibitors of the present invention, are ineffective.

EXAMPLE III

Another oil alkyd primer was prepared with the following formulation:

| | Parts by Weight |
|---|---|
| Long Oil Soya Alkyd | 11.5 |

Mill for an additional 30 minutes and add

| | |
|---|---|
| Long Oil Soya | 27.6 |
| Mineral Spirits | 5.10 |
| 24% Lead Napthenate | 0.47 |
| 10% Cobalt Octoate | 0.12 |
| Anti-Skimming Agent | 0.10 |

The primers were at a film thickness of three mils on an untreated street panel, scribed, and exposed for nine months in Curtis Bay, Md. (near Baltimore) at a 45' south elevation. The area is a highly industralized marine environment.

The following results were obtained:

TABLE III

| Table No. | Corrosion Inhibitor | Wt. % Inhibitor In Primer | Creepage from Scribe |
|---|---|---|---|
| 1 | Zinc Chromate | 19 | 1/16" Dense blistering along scribe |
| 2 | Barium Meta-Borate | 19 | 1/16"+ Dense blistering along scribe |
| 3 | Zinc Phosphate | 19 | 1/16" + Dense blistering along scribe |
| 4 | Ba/Na USY (Sample D) | 11 | 1/16" Medium dense blistering along scribe |
| 5 | Ba/Na USY (Sample D) | 25 | 1/16" Few blisters along scribe |
| 6 | Hydrotalcite | 11 | 3/32" Medium blistering along scribe |

The above results show that the corrosion inhibitor of the present invention (Test Nos. 4 & 5) are equivalent to or better than corrosion inhibitors of the prior art (Test Nos. 1, 2, 3 & 6).

EXAMPLE IV

Another example of this primer study is as follows: An epoxy urea primer such as the type used in the coil coating industry on 1303 galvanized steel was prepared and the corrosion inhibitor was varied. The basic formula is:

| Epoxy Urea Coil Primer | Parts per Hundred |
|---|---|
| Epiclorohydrin bis-phenol resin (35% solution)* | 31.0 |
| China Clay | 14.5 |
| Corrosion Inhibitor (as identified in TABLE IV) | 4.3 |
| $TiO_2$ | 15.2 |
| Fumed Silica | 0.8 |
| Cellosolve Acetate | 10.8 |
| Urea Formaldehyde resin | 11.3 |
| Aromatic solvent | 9.1 |
| Organic modified smectite clay | 0.4 |
| Di-acetone alcohol | 2.6 |

*35 parts Epon 1009 32.5 parts MIBK 32.5 parts Butyl Cellosolve

The primer was applied by spraying on 1303 galvanized steel to a dry film thickness of 0.4 mils. It was baked to a peak metal temperature of 450° F. for one minute and scribed. The various primers were exposed 1000 hours in the salt spray test (ASTM-B117). The amount of corrosion inhibitor was held constant in this test at 4.3 weight percent.

The results are as follows:

TABLE IV

| Table No. | Corrosion Inhibiting Pigment | Creepage From Scribe | Blistering* |
|---|---|---|---|
| 1 | Zinc Hydroxy Phosphite | No Change | 7F |
| 2 | Zinc Hydroxy Phosphite | 3/16 | 6MD |
| 3 | Basic Lead Silica Chromate | No Change | 8MD |
| 4 | Zinc Phosphate | ¼ | 8MD |
| 5 | Barium Metaborate | 3/16 | 8MD |
| 6 | Strontium Chromate | No Change | None |
| 7 | Ba/Na USY (Sample D) | ⅛ | 8M |
| 8 | Ca/Na USY (Sample B) | 3/16 | 8D |
| 9 | Mg/Na USY (Sample C) | ¼ | 6M |

*Evaluated as follows: ASTM D714-56

The above results indicate that paint formulations containing corrosion inhibitors of the present invention (Test Nos. 7, 8 & 9) are similar to most of those which contain conventional prior art inhibitors (Test Nos. 1-6).

A group of metal exchanged sodium Y zeolites (NaY) of the present invention were prepared as follows:

Mg/NaY (3.9 weight percent $Na_2O$-6.0 weight percent MgO) was prepared by adding 500 g dry basis (670.9 g as is) of Na-Y zeolite to 2.5 l 150° F. $H_2O$ containing 203.3 g magnesium chloride hydrate ($MgCl_2.6H_2O$) for one-half hour at 150° F., filtering and washing twice with 2.5 l 150° F. $H_2O$. The exchange was repeated and the sieve then washed three times with 2.5 l 150° F. $H_2O$. After calcination for 1 hour at 1000° F., the exchange was repeated once again and the filter cake dried overnight at 250° F.

Ba/Na Y (0.8 weight percent $Na_2O$-22.5 weight percent BaO) was prepared in the same way except that 256.1 g barium chloride hydrate ($BaCl_2.2H_2O$) was used for each of the three exchanges.

Ca/Na Y (0.05 weight percent $Na_2O$-9.0 weight percent CaO) was also prepared in the same way as the Mg/Na Y except that 111 g anhydrous calcium chloride was used for each of the three exchanges.

EXAMPLE V

A typical epoxy polyamide maintenance primer with the following composition was prepared and applied to sand blasted steel panels:

| Part A | |
|---|---|
| Epoxy Resin (Epiclorohydrin bis-phenol) | 17.2 |
| Methyl isobutyl ketone | 2.8 |
| Cellosolve | 4.5 |
| Corrosion Inhibitor (as identified in TABLE V) | 41.5 |
| Iron Oxide (Mobay) | 1.7 |
| Magnesium Silicate | 8.2 |
| Urea Formaldehyde Resin | 1.0 |
| Xylol | 8.4 |

-continued

| | |
|---|---|
| Mica 325 mesh | 2.6 |
| Part B | |
| Epoxy hardner-polyamide | 12.0 |

The panels were aged for one week and subjected to salt spray exposure. The results are summarized in TABLE V.

TABLE V

Epoxy Polyamide Primer - Sand Blasted Steel, 1000 Hours Salt Spray

| Test No. | Inhibitor | Wt. % | Film Thickness Mils | Creepage from Scribe (Inches) | Blisters-Appearance |
|---|---|---|---|---|---|
| 1 | Zinc Phosphate | 32 | 5.5 | 3/16 | 4M+- Along Scribe |
| 2 | Calcium Exchanged Silica | 23 | 6.8 | ⅛ | Moderate Staining |
| 3 | Calcium Exchanged Silica | 13 | 6.4 | 3/32 | Slight Staining |
| 4 | Ca/Na Y | 23 | 4.8 | ⅛ | Moderate Staining |
| 5 | Ca/Na Y | 13 | 5.8 | 3/16 | Moderate Staining |
| 6 | Ba/Na Y | 23 | 5.9 | 3/16 | Moderate Staining |
| 7 | Ba/Na Y | 13 | 5.2 | ⅛ | Slight Staining |
| 8 | Mg/Na Y | 23 | 6.1 | ⅛ | Slight Staining |
| 9 | Mg/Na Y | 13 | 4.7 | ⅛ | Slight Staining |

The above results show that the paint formulations containing corrosion inhibitors of the present invention (Test Nos. 4–9) are similar to the formulations which contained prior art corrosion inhibitors (Test Nos. 1–3).

We claim:

1. A paint composition which contains an alkaline earth metal exchanged Y zeolite, said zeolite being substantially free from heavy metal cations.

2. The composition of claim 1 wherein the zeolite is ultrastable Y zeolite.

3. The composition of claim 1 or 2 wherein the alkaline earth metal cation is a member of the group Mg, Ca, Ba, and mixtures thereof.

4. The composition of claim 3 wherein the amount of alkaline earth cation in the zeolite expressed as oxide is within the range of about 3–25 weight percent.

5. The composition of claim 1 wherein the amount of zeolite is in the range 1 to 20 weight percent.

6. A metal substrate coated with the composition of claim 1.

7. A method for protecting a metal substrate from corrosion which comprises coating the substrate with the composition of claim 1.

* * * * *